July 5, 1938.  G. W. READ ET AL  2,122,660
MEANS FOR PREVENTING AN UNDESIRED BACKWARD MOVEMENT OF MOTOR VEHICLE
Filed March 3, 1934

INVENTOR
George W. Read and Frederick J. Eisler
BY
Arthur Philips Marr
ATTORNEY

Patented July 5, 1938

2,122,660

UNITED STATES PATENT OFFICE 2,122,660

MEANS FOR PREVENTING AN UNDESIRED BACKWARD MOVEMENT OF MOTOR VEHICLES

George W. Read and Frederick J. Eisler, Forest Hills, N. Y., assignors to Read-Eisler Corporation, New York, N. Y., a corporation of New York Application March 3, 1934, Serial No. 713,804

6 Claims. (Cl. 188—30)

The device, the subject of this invention is intended as a means for preventing a motor vehicle moving backward when the vehicle is stopped while traveling upward on a grade.

In the description of our device which follows, we will refer to the mechanism of ordinary automobiles, and while we may feel that our device is particularly advantageous for use on trucks and especially high-speed trucks, we will in no way limit our device or its use, but will refer to it as used on an automobile of conventional construction and design.

When an automobile is stopped, it is customary to apply the brakes, release the clutch and then put the gear shift in neutral. If the brakes have been applied with sufficient force and hold in a satisfactory manner, the automobile will remain stationary, but if the brakes slip, a backward movement of the automobile, if it has been stopped while going up a grade or incline, must naturally occur.

Great difficulty arises when it is desired to again put the automobile in motion.

With the engine running it is necessary to do three things almost simultaneously. With the transmission again in engagement it is necessary to engage the clutch, release the brake and operate the throttle. As the clutch, brake and throttle are usually all foot operated, it is exceedingly difficult to perform these operations with such rapidity that the engine can be caused to move the vehicle forward immediately that the brake is released. Even with expert operators, some backward movement of the vehicle is almost sure to occur. This is especially true if the engine is sluggish, if the clutch does not engage promptly, or if the vehicle is of itself heavy or is carrying a very great load.

The use of the emergency brake at this time is also fraught with difficulties in that this requires the use of one hand at a time when both hands should be on the steering wheel. Further emergency brakes are usually so placed that their use causes the operator to assume an awkward or undesirable position and therefore they are not usually employed.

The difficulties of starting a vehicle when stalled or stopped on a hill, and particularly if the hill is quite steep, are so numerous that more or less serious accidents caused by this undesirable backward movement of an automobile are a daily occurrence and naturally occur more and more often as traffic becomes more and more congested.

The object of this invention is then to prevent this undesired backward movement and the means for carrying out our invention will be fully described as the specification progresses.

The following is what we consider the best means for carrying out our invention and the accompanying drawing should be referred to for a complete understanding of the specification which follows:

In the drawing:

Fig. 3 is a plan view of our device.

Similar reference numerals indicate like parts in all the figures where they appear.

At 1 we show a wheel for a motor vehicle and at 2 the tire thereof. The wheel may be either a disk wheel as indicated or a spoke wheel and secured to the disk or spokes is a drum or disked member shown at 3.

Figure 2:
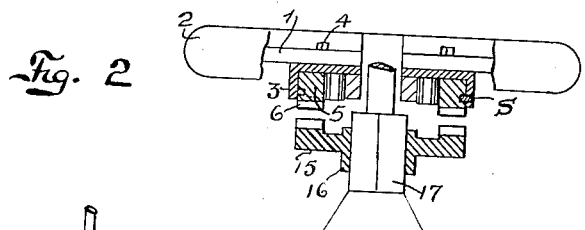
Fig. 2 is a sectional view of our device with a part of the vehicle fractured to disclose the location of our mechanism.

Freely rotatable within the brake drum and in the cupped portion thereof, is a disk 5, having a projecting portion 6, which projecting portion is provided with a plurality of teeth 7. The member 5 may as a whole, be considered a crown gear operable freely in the brake drum cup 3 but retained against axial movements by any suitable mechanical means such as the circumferential slot and projection indicated at S in Fig. 2.

Within the crown gear and firmly secured to the wheel is a member 8 which may be considered a disk except for the fact that two portions of this member 8 have been cut away as shown at 9 and 10 to provide recesses for rollers which are shown at 11 and 12. These rollers then operate between the inner periphery of the annulus or crown gear 7 and the disk member 8 and it will be noted that the recesses 9 and 10 in which the rollers 11 and 12 operate are approximately parallel with each other but are parallel with only one transverse axis of the member 8, springs 13 and 14 urge the rollers into the narrowest part of their recesses and cause them to jamb between the disk member 8 and the crown gear 5.

We have been describing an over-running clutch of a type generally well understood except for the fact that the member 5 is ordinarily free to rotate with the cup member 3 and actually floats in this cup member under all ordinary conditions of operation and under such conditions, the driving mechanism of the vehicle will operate in the conventional manner, just as it should if our device was not attached thereto.

Figure 7:
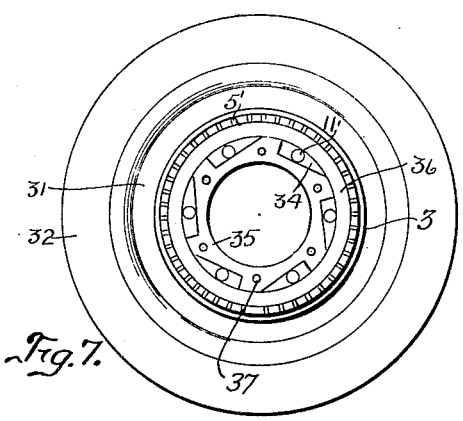
Fig. 7 shows in elevation a wheel having a modified construction.
Figure 8:
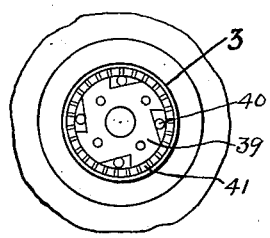
Figure 8 is a small fractured view of a wheel showing the location of applicants' device within the brake drum.
Figure 4:
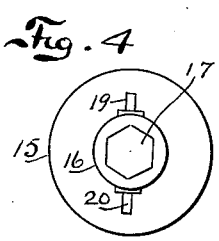
Fig. 4 is an end elevation of a part removed.
Figure 5:
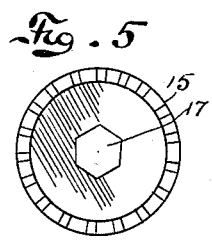
Fig. 5 is an elevation of the same part but viewed in the opposite direction.
Figure 6:
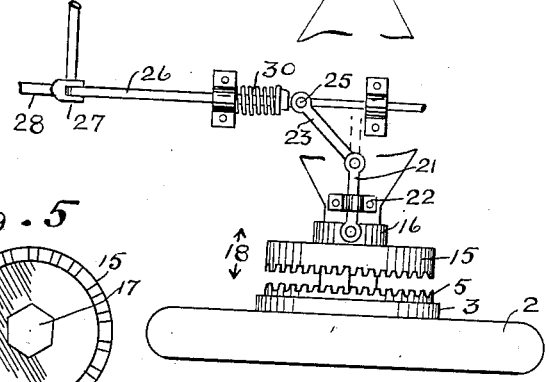
Fig. 6 shows the mechanism for operating our device.

We show a means for putting our device in operation, rather than having it continuously operative and for the reason that we desire to allow the vehicle to operate forward or backward in the usual and conventional manner, so therefore when the parts are arranged as shown in Figures 7 and 8, our device will be inoperative. To put the device in operation for the purpose intended, we provide a crown gear 15, arranging it upon a non-rotatable part probably formed integral with the axle housing or differential casing. This member 15 is not rotatable, it is provided with a hub 16, which engages in a sliding fit with the member 17, which as before stated is non-rotatable and is formed as a part of the axle housing, and we prefer that the projection 17 be hexagonal as indicated in Figures 4 and 5 for the added strength that can be obtained thereby. The member 15 is free to slide on the projection 17 and in the directions indicated by the arrow 18, and to obtain this sliding motion we provide a plurality of pins 19 and 20 on the hub 16 of the member 15. We provide links as shown at 21 and passing through suitable guides as shown at 22 and operated by additional links 23 and 24, which are operated from a bar 25. This bar is in turn operated by rod 26 and through a suitable crank 27 and rod 28 by the hand lever 29. This mechanism is one of the ways that our device can be operated and we prefer to provide a spring 30 which will urge the links 21 inward when the lever 29 is released.

When the lever 29 is released, the crown gear 15 will be moved into firm and definite engagement with the crown gear 5 and thereupon the crown gear 5 is retained stationary, now when the vehicle is moving forward, the crown gear 5 will operate over the rollers 11 and 12 urging these rollers toward their respective springs 13 and 14, but when the vehicle is stopped and the wheels attempt to rotate backward, the rollers 11 and 12 will be moved into the narrow part of their respective recesses locking the disk 8 to the crown gear 5, thus preventing rotation of the disk and perforce the wheel to which it is secured in one direction. When the wheels is again started up the grade, the wheels may turn freely forward; in fact with this device, the use of brakes to hold a vehicle from moving backward down a hill is entirely unnecessary, the device performing that function automatically.

When rolling along a level road, down an incline or even up an incline where stoppage is unnecessary, the hand lever 29 may be operated withdrawing the crown gear 15 and as previously stated the vehicle will operate in the usual and ordinary manner.

Figure 1:
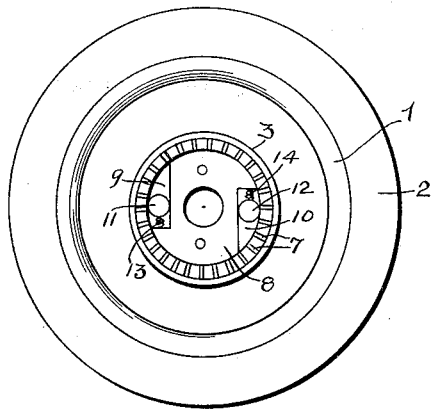
Fig. 1 shows in elevation a wheel of a vehicle fitted with a part of the device which constitutes the invention.

In Figures 7 and 8 we show our device as constructed to be employed on vehicles having interior brakes. In Figure 7, the wheel is shown at 31, the tire at 32; and in this instance the recesses 34 receiving the rollers 11' are formed in the member 35 and which may be secured to the wheel by bolts as indicated at 37. The rollers shown at 11' may be of a greater number than those shown in Figure 1 and this figure indicates that a plurality of rollers may be employed.

The rollers 11' operate upon a ring member 36 formed integral with the crown gear 5'. This crown gear is received in the extruded portion of a disked wheel and this construction will only operate with disk wheels having large basin type hubs such as are usually found on heavy trucks and this construction is important because of the greater diameter of the gear 5' and the great strength that can be given to this gear because of the peculiar shape of the wheel itself, this ring member 36 and its crown gear 5' may be retained in much the same manner as is the crown gear 5 and as indicated as S in Fig. 2.

In the construction shown in Fig. 7 the brake member is an expansion brake as indicated and to operate this brake it is necessary to slot the non-rotatable gear member 15 which is arranged upon the axial housing 17 so as to allow the brake levers or the hydraulic tubes, to extend through this gear to operate the brake bands.

The three devices of the construction herewith shown all operate in exactly the same manner, but we desire it understood that the operating mechanism will be changed to meet particular conditions and further such a rugged operating mechanism will not be required upon smaller pleasure cars. Other modifications may be made within the scope of the appended claims without departing from the principle or sacrificing the advantages of this invention.

Having carefully and fully described our invention, what we claim and desire to obtain is:

1. A means for preventing an undesired backward movement of motor vehicles which consists of a gear member supported by and normally rotatable with the wheel of a vehicle; a second gear adjacent to said first mentioned gear and adapted to be moved into engagement with said first gear and means for allowing the wheel to operate freely in one direction only when said gears are engaged.

2. A device of the character described, comprising a disk provided with a plurality of recesses and secured to a wheel, a ring member normally rotatable with said disk, means non-rotatably secured to said vehicle and adapted to be moved longitudinally of the axis of said wheel to engage said ring, and a flexible means for urging said non-rotatable member into engagement with said ring.

3. In a device of the character described, an overrunning clutch, one part of which is secured to the wheel of a vehicle and normally rotated therewith, another part of which is normally capable of rotation independent of said first mentioned part, said clutch having a non-rotatable part movable bodily and axially of said wheel and adapted to engage the said independently rotatable part of said clutch, a plurality of slidable links and a plurality of pivoted links and means for operating them and adapted to operate said non-rotatable member to cause it to move into engagement with or out of engagement from the free member of said clutch.

4. In a device of the character described, an overrunning clutch, one part of which is secured to the wheel of a vehicle and normally rotated therewith, another part of which is normally capable of rotation independent of said first mentioned part, said clutch having a non-rotatable part movable bodily and axially of said wheel and adapted to engage the said independently rotatable part of said clutch, a plurality of slidable links and a plurality of pivoted links and means for operating them and adapted to operate said non-rotatable member to cause it to move into engagement with or out of engagement from the free member of said clutch, and automatically operating means between said independently rotatable member and said first mentioned member for releasably locking said independently rotatable member to said first mentioned member.

5. Means for preventing an undesired backward movement of a motor vehicle comprising a wheel having a hub, a dished member secured to said wheel and adjacent said hub, a gear member mounted in said dished member and normally rotatable with said wheel, a second gear member adapted to be engaged with said first mentioned gear member, means for preventing a rotation of said second gear member and means for sliding said second gear member into engagement with said first gear member and means between said first gear and said wheel for locking said wheel against movement in one direction.

6. In a device of the character described, means for restraining one or more of the wheels of a vehicle against operation in one direction, said means comprising a normally rotatable member secured to the wheel of a vehicle and a normally non-rotatable and slidable restraining member and means for moving said restraining member into and out of engagement with said normally rotatable member to allow said wheels to operate in either direction when the parts are so disengaged.

GEORGE W. READ.
FREDERICK J. EISLER.